E. W. SWARTWOUT.
VEHICLE SIGNALING APPARATUS.
APPLICATION FILED AUG. 23, 1916.
1,365,127.
Patented Jan. 11, 1921.
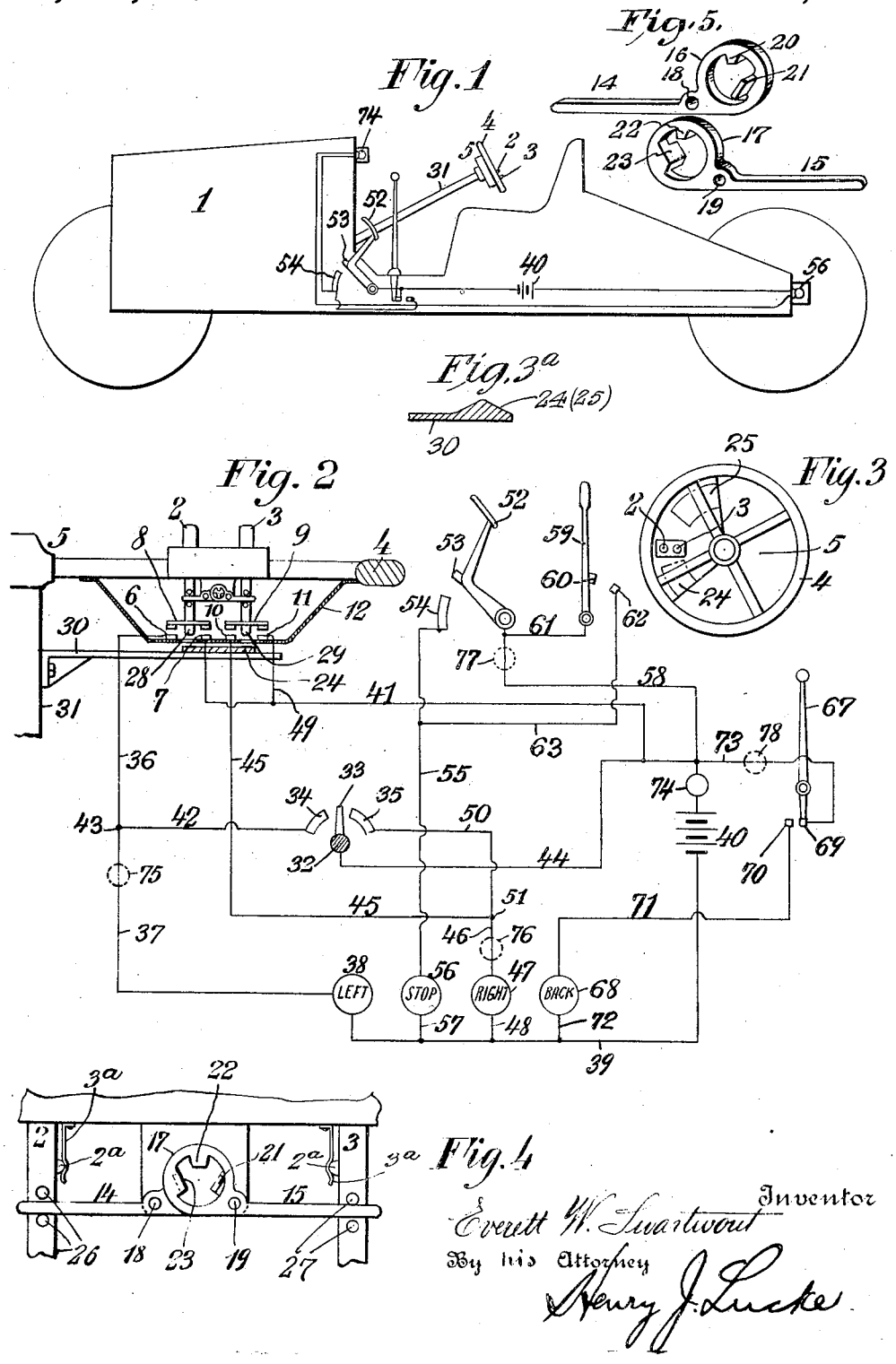

UNITED STATES PATENT OFFICE.

EVERETT W. SWARTWOUT, OF WHITE PLAINS, NEW YORK.

VEHICLE SIGNALING APPARATUS.

1,365,127.  Specification of Letters Patent.  Patented Jan. 11, 1921.

Application filed August 23, 1916. Serial No. 116,433.

*To all whom it may concern:*

Be it known that I, EVERETT W. SWARTWOUT, a citizen of the United States of America, residing at White Plains, Westchester county, State of New York, have invented certain new and useful Improvements in Vehicle Signaling Apparatus, of which the following is a specification.

This invention relates to vehicle signaling apparatus.

More particularly, the invention is directed to vehicle signaling apparatus comprising signaling means disposed at the rear or the front, or both, or other suitable part of the vehicle whereby the course of the vehicle will be indicated to the drivers of other vehicles, the traffic policemen, pedestrians, etc.

In the usual forms of my invention means are provided whereby the driver or chauffeur may indicate prior to arriving at a point of optional course the direction which he intends to pursue. In the preferred forms of my invention, I have provided manually operated means for indicating in advance of the actual movement of the steering wheel the direction to, "left" or "right" intended to be traversed by the driver combined with suitable means for indicating the course of travel after the steering wheel has been turned. Also in such preferred forms of my invention, I have provided means automatically operated upon actuation of the foot brake or emergency brake, or both, for automatically indicating the "stop" indication; similarly, automatic means are provided for setting the "back" indicator upon operation of the reversing device of the vehicle. Such provision of means may be operated electrically, or mechanically, or a combination of both electrical and mechanical means.

In the most preferred form of my invention, I have devised suitable manually operated means for indicating in advance a change to a lateral course of the vehicle, in combination with automatically operated means operative upon a substantial extent of movement of the vehicle along such lateral course for checking or reëstablishing the lateral course indicator. In such preferred form of the invention, the manually operated means is rendered ineffectual after the steering wheel has been turned beyond a predetermined extent, thereby preventing the possibility of the indication of a wrong signal after the steering wheel has been turned. In this form of the invention, the "stop" indicating and controlling means are so arranged to be operated conjointly with such lateral course indicating and operating means, and similarly in the operation of the "back" indicating and operating means.

Further objects and features of the invention will be more fully understood from the following description and the accompanying drawings, in which—

Figure 1 is a side elevation of an automobile shown diagrammatically provided with a form of my invention;

Fig. 2 is a diagrammatic view showing a preferred form of my invention, certain parts of which are indicated in Fig. 1; and Fig. 3 is a detail plan view of the steering wheel showing the manually operated means and the cams coöperating therewith;

Fig. 3ª is a detail sectional view, on an enlarged scale, of the aforesaid cams;

Fig. 4 is a detail side elevation, on a greatly enlarged scale, showing certain parts of the aforesaid manually operated means.

Fig. 5 is a detail view of certain parts.

Referring to Figs. 1 to 5 inclusive, the vehicle 1 shown as an automobile is indicated as provided with manually operated plungers 2, 3, for indicating in advance the intended change to a lateral travel of the vehicle. Such plungers 2, 3, are shown mounted adjacent the rim 4 of the steering wheel 5. As more fully shown in Fig. 2, such plungers 2, 3 are arranged to permit the operation of solely one of said plungers at a time, combined with automatic means for restoring the plungers to neutral position after the steering wheel has been turned beyond a predetermined extent of rotation.

The plunger 2, for showing "Left" is preferably arranged at the left hand side of the rim 4 and the plunger 3, for showing "Right," arranged either immediately to the right or to the rear of plunger 2. The plunger 3, either alone or with plunger 2, may be placed on the right hand side of the rim 4.

A suitable form of such means is indicated in Fig. 2, comprising the double contacts 6, 7, adapted to be electrically closed by means of the movable contact piece 8 controlled by the plunger 2. Similarly, the plunger 3 controls the movable contact piece 9 adapted to bridge the contacts 10, 11.

Any suitable means are provided for retaining the plungers 2, 3, in depressed position when set, to thereby maintain closure of the circuit, and as one such means, I have shown each of the plungers 2, 3, provided with a button cam 2ª and the cam spring 3ª as indicated in Fig. 4. The contacts 6, 7 and 10, 11 are suitably mounted in relation to the plungers and their operated parts as by means of the insulating casing 12.

Combined with the plungers 2, 3 are means for permitting the operation of solely one at a time, and may comprise the links 14, 15 (see also Figs. 4 and 5) provided with similar concentrically arranged annular portions 16, 17, respectively having pivot bearings at their respective pivots 18, 19; said annular portion 16 is provided with the stop 20 disposed wholly within the plane of portion 16 and the finger 21 extending over into the plane of annular portion 17, whereas the annular portion 17 is provided with the stop 22 disposed wholly within the plane of the portion 17 and with the finger 23 extending over within the plane of portion 16. The neutral positions of links 14, 15, are shown in Fig. 2 and the arc spacing of stop 20 relative to finger 23, similarly stop 22 relative to finger 21, is equal to the throw of said links 14, 15 respectively, from neutral to closed position. Thus, upon "closing" the plunger 2, the link 14 will be oscillated anti-clockwise, (as viewed in Fig. 4) while the link 15 remains stationary and the finger 21 will have moved to just touch stop 22. Upon subsequent "closing" of plunger 3, the link 15 will be oscillated clockwise and stop 22 by engagement with finger 21 will move link 14 to neutral position.

The means for restoring both links 14, 15 to neutral position after a predetermined extent of turning of the steering wheel 5, is indicated by the cam 24 (see Fig. 3) operative upon turning the wheel 5 for a "left" turn of the vehicle and by the cam 25 operative similarly for a "right" turn. The respective instants of initial operation of cams 24, 25 are preferably slightly in retard of the instants of operation of the mechanism operated automatically upon turning of the steering wheel, described more particularly hereinafter. The links 14, 15, are shown connected to the respective plungers 2, 3, by the sets of pins 26, 27 to permit relative movement of links 14, 15, and the respective plungers 2, 3.

Each cam 24, 25, coöperates with the heels 28, 29, of the respective plungers 2, 3, shown extending below the respective bridge pieces 8, 9. In the position indicated in Fig. 2, showing "straight-away" position of the steering wheel, the cam surface of cams 24, 25 is "low" or may be omitted, and the "rise" in each cam 24, 25, begins at the predetermined point of initial action of said cams 24, 25, respectively, after the wheel 5 has been actually turned to the "left" or to the "right" respectively. The cams 24, 25 are mounted on a suitable support 30 fixed to casing 31 surrounding the steering post 32.

The automatic lateral course indicating means is shown in Fig. 2 displaced slightly to the right and below the steering wheel 5, and comprises the radial contact 33 fixed to the steering post 32 controlled by the steering wheel 5, and the contact arcs 34, 35, engaged by the radial contact 33 upon turning the post 31 to the "left" or the "right" respectively. The electrical connections of the aforesaid parts are as follows: Said contact 6 is connected to wire 36, thence to wire 37, lamp 38 (indicating "left"), wire 39, thence through battery 40, wire 41 back to contact 7. The arc contact 34 is connected to wire 42 joining at 43 with wire 36 and radial contact 33 by wire 44 to the battery 40. Said contact 10 is connected by wire 45, to wire 46, thence to lamp 47 (indicating "right"), wire 48, wire 39, battery 40, wire 41, and by wire 49 to contact 11. Said contact arc 35 is connected to wire 50, joining wire 46 at 51.

The operation of the aforesaid indicating means for a change of travel to a lateral course is as follows. Upon depressing the "left" button 2, the "left" lamp 38 will be lighted. Such indication may be given when the vehicle is at a full stop or when traveling straightaway. Upon actually turning the steering wheel 5 to the "left" to and beyond a predetermined point, the radial contact 33 will contact with contact arc 34 and the cam 24 at a point in retard of said predetermined point will throw the contact bridge 8 to its neutral position. A similar operation of the electrical operated lamp 48 (indicating "right") will take place upon depressing button 3 in advance and upon actual turning of the steering wheel 5 to the "right."

It will be noted that in case of error by the driver in depressing either button 2, 3, the error will be automatically corrected upon actual turning of the steering wheel. It will also be noted that the said arrangement positively precludes the operation of an erroneous lateral course indication by any attempt to operate the manually operated means after the steering wheel has been actually turned.

The foot brake 52 is also provided with automatically operated means for showing "stop," as by means of the contact 53 mounted on brake lever 52 adapted to engage the contact 54, connected by wire 55 to lamp 56 (indicating "stop") and by wire 57 to wire 39, through battery 40 and thence by wire 58 to contact 53. Preferably, as shown in the drawings, the contact 54 is arc-shaped, whereby engagement of the contact 53 with said arc-shaped contact 54 will be effected upon partial application of the foot brake. The emergency brake 59 is similarly connected to the lamp 56, as by contact 60 mounted on brake lever 59 and connected by wire 61 to wire 58, said contact 60 upon operation of the brake 59 being brought into contact 62 connected by wire 63 to said wire 55. Thus, upon operation of either foot brake 52 or hand brake 59, or both, the "stop" signal will be indicated. It will be noted that the contacts of the foot lever 52, and the contacts of the emergency brake 59, and the contacts of the reverse lever 67 are spaced respectively a predetermined distance from one another whereby the signal is set upon the operation of the corresponding aforesaid control device beyond a predetermined extent. It will be observed that such "stop" indication will be indicated even though a "right" or a "left" indication be given at the same time, and accordingly my invention provides means for indicating both the direction of the course of the vehicle and the extent of the course in the indicated direction.

The reversing lever 67 indicates broadly any suitable means for effecting "reverse" movement of the vehicle. The "back" lamp 68 will be lighted upon engagement of contact 69 with contact 70, by means of wire 71, lamp 68, wire 72, wire 39, battery 40 and thence by wire 73 leading to contact 69. The "back" indication, it will be noted, may be given simultaneously with "stop" or either "left" or "right" or both "stop" and either "left" or "right."

I have also shown the pilot lamp 74 connected relative to the battery 40 and the aforesaid circuits to serve as a common pilot lamp of all circuits. However, indicating lamps individual pilot lamps may be provided, as the lamp 75 for the "left" circuit, the lamp 76 for the "right" circuit, the lamp 77 for the "stop" circuit and the lamp 78 for the "back" circuit. Such common pilot lamp 74, or the respective pilot lamps, may be mounted on the dash board, if desired, or at other suitable positions. In the above forms of my invention, the radial contact may be attached directly or connected indirectly to the steering post at a location below the floor of the vehicle body and the contact arcs suitably positioned relative to the radial contact and supported, including proper insulation, on the chassis or other desirable part of the vehicle.

It will be further understood that whereas I have specifically described only certain of the embodiments of my invention, many modifications and changes may be made without departing from the invention except as is demanded by the claims.

I claim:

1. The combination with a vehicle, of a plurality of independently indicating signals, a plurality of manual means for separately setting said signals, respectively, means interconnecting said manual means for effecting the operation of solely one of said manual means at a time and means operative upon the movement of the vehicle in the direction of the set indicating signal for automatically restoring the operated manual means to neutral position.

2. The combination with a vehicle, of a plurality of independently indicating signals, a plurality of plungers for respectively setting said signals, means interconnecting said plungers for effecting the operation of solely one of said plungers at any time, and means operative upon the movement of the vehicle in the direction of the set indicating signal for automatically restoring the operated plunger to neutral position.

3. The combination with a vehicle having a steering wheel, of a plurality of course indicating signals, a plurality of manual means for respectively setting said signals, means interconnecting said manual means for effecting the operation of solely one of said manual means at a time, means actuated upon movement of said steering wheel over a predetermined extent for setting one of said signals and means operative upon the movement of said steering wheel beyond said predetermined extent for rendering said manual means ineffectual.

4. The combination with a vehicle having a steering wheel, of a plurality of indicating signals, means for respectively operating said signals in advance of movement of said steering wheel from neutral position, means actuated upon movement of said steering wheel from neutral position for setting one of said signals and means operative upon movement of said steering wheel beyond a predetermined extent for precluding the operation of said advance operating means.

5. The combination with a vehicle having a steering wheel, of a plurality of indicating signals, means actuated upon the movement of said steering wheel from neutral for setting one of said signals, means separate from said setting means for respectively setting said signals in advance of the operation of said steering wheel, and means operative upon a predetermined extent of movement of said steering wheel from neutral for precluding the operation of said second named setting means.

6. The combination with a vehicle for a steering wheel, of a plurality of movement indicating signals, means operative upon the movement of the steering wheel from neutral for setting said signals respectively in correspondence to the movement of said wheel, manually operative means separate from said setting means for setting said signals, means interconnecting said manually operative means for effecting the operation of solely one of said manual means at a time, and means operative upon the movement of said steering wheel from neutral beyond a predetermined extent for precluding the operation of said manually operative means.

7. In combination with a vehicle having a steering device, of a plurality of direction indicating signals, manually operative means operable in advance of the operation of said steering device for setting at will any one of said signals and means operative on movement of said steering device beyond a predetermined extent for resetting said manually operative means to inoperative position and maintaining the signal in its operated condition.

8. The combination with a vehicle having a steering wheel, of a plurality of direction indicating signals, means operative upon the movement of said steering wheel for setting one of said signals corresponding to the movement of said steering wheel, manually operative means operable in advance of the operation of the steering wheel for setting said one signal and means operative upon the movement of said steering wheel upon a predetermined extent for resetting said manually operative means to inoperative position without disturbing said one signal in its operated condition.

9. The combination with a vehicle having a steering device, of a plurality of indicating signals, manually operative means for setting at will any one of said signals, means operative upon movement of said steering device for setting one of said signals corresponding to the change of movement of said vehicle and means operative on movement of the steering device beyond a predetermined extent for resetting said manually operative means to inoperative position without disturbing said one signal in its operated condition.

10. The combination with a vehicle having a steering device, of a plurality of independently indicating signals, manually operative means for setting at will any one of said signals, means operative upon movement of said steering device for setting one of said signals corresponding to the change of movement of said vehicle and means operative on movement of the steering device beyond a predetermined extent for resetting said manually operative means to inoperative position without disturbing said one signal in its operated condition.

11. The combination with a vehicle having a steering device, of a plurality of movement indicating signals, manually operative means for setting at will any one of said signals, means for effecting the movement of solely one of said manual means at a time, means operative upon the movement of said steering device for setting the signal of said signals corresponding to the movement of said steering device, and means operative upon the movement of said steering device for precluding the operation of said manually operative means.

12. The combination with a vehicle having a steering device, of a plurality of independently indicating, direction indicating signals, manually operative means for setting at will any one of said signals, means operative upon movement of said steering device for setting one of said signals corresponding to the change of movement of said vehicle and means operative on movement of the steering device beyond a predetermined extent for resetting said manually operative means to inoperative position without disturbing said one signal in its operated condition.

13. The combination with a vehicle having a steering device, of a plurality of direction indicating signals, manually operative means operable in advance of the operation of the steering device for setting at will any one of said signals and means operative upon movement of said steering device for setting one of said signals corresponding to the change of lateral movement of said steering device beyond a predetermined extent and for resetting said manually operative means to inoperative position.

14. The combination with a vehicle having a steering device, of a plurality of indicating signals, manually operative means operable in advance of the operation of the steering device for setting at will any one of said signals, said manually operative means comprising a plurality of separately operated manipulating elements, and means operative upon the movement of said steering device beyond a predetermined extent for resetting said manually operative means to inoperative position and maintaining the signal in its operated condition.

15. The combination with a vehicle having a steering device; of a plurality of indicating signals, manually operative means operable in advance of the operation of said steering device for setting at will any one of said signals, said manually operative means including a plurality of separably operative manipulating elements and means interconnecting said manipulating elements for effecting the operation of solely one of said manipulating elements at a time; and means operative upon movement of the steering device beyond a predetermined extent for resetting the operated manipulating element of said manually operative means to inoperative position and maintaining the signal in its operated condition.

16. The combination of a vehicle having a steering wheel, of a plurality of independently operated, course indicating signals, means operative upon movement of said steering wheel for setting a course indicating signal, additional means for setting said course indicating signal in advance of the movement of said steering wheel, said second named means including manually operated plungers, means for effecting the manipulation of solely one of said plungers at a time and means operative upon a predetermined extent of movement of the steering wheel in the direction to effect movement of the vehicle in the direction indicated by the set signal for restoring the manipulated plunger to its neutral position.

17. The combination with a vehicle having a steering device, of a plurality of independently indicating movement indicating signals, electrical means operative upon movement of said steering device for setting signal corresponding to such movement of said steering device, said means including a contact controlled by said steering device, manually operative electrically controlled means for setting any desired signal of said signals in advance of movement of said steering device, said second named means including a contact arranged in parallel to said first named contact and means operative upon said such movement of said steering device for precluding the operation of said manually operative means.

18. The combination with a vehicle having a steering device, of a plurality of movement indicating signals, manually operative means for respectively setting said signals, and positive means operative upon the movement of said steering device to a predetermined single point for each direction of movement of said device for rendering said manually operative means non-operable.

19. The combination with a vehicle provided with a steering device, of a plurality of movement indicating signals, manual means for separately setting said signals respectively, means interconnecting said manual means for effecting the operation of solely one of said manual means at a time, and means operative upon the movement of the steering device of said vehicle for operating said signals and for precluding the operation of said manually operated means.

20. The combination with a vehicle provided with a steering device, of a plurality of movement indicating signals, separate plungers for respectively setting said signals, means interconnecting said plungers for effecting the movement of solely one of said plungers at a time and means operative upon the movement of said steering device in the direction of the set indicating signal for maintaining the set signal in set position and precluding the operation of said manual means.

21. The combination with a vehicle having a steering device of a plurality of movement indicating signals, manually operated means for respectively setting said signals, means operative upon the movement of said steering device for setting the indicating signal of said indicating signals corresponding to such movement and positive means operative upon the movement of said steering device to a predetermined single point for each direction of movement of said device for rendering said manually operative means non-operable.

22. The combination with a vehicle having a control device, of a plurality of indicating signals, means operative upon the movement of said control device beyond a predetermined extent for setting one of said signals, separate means for setting one of said signals, positive means for restoring said separate means to neutral position and for rendering said separate means non operative effective upon the movement of said control device to a single predetermined point for each direction of movement of said control device.

In testimony whereof I have signed this specification.

EVERETT W. SWARTWOUT.